(12) United States Patent
Purves et al.

(10) Patent No.: US 10,803,504 B2
(45) Date of Patent: Oct. 13, 2020

(54) METHOD FOR GENERATING BY PROCESSOR A SECOND ACTIONABLE ITEM FOR EXECUTION BY A DATA PAYLOAD EXECUTION PLATFORM IN ORDER TO COMPLETE PROCESSING OF AN ACTION FROM A FIRST ACTIONABLE ITEM

(71) Applicants: Thomas Purves, San Francisco, CA (US); Margaret Szeto, Mountain View, CA (US); Chunxi Jiang, San Francisco, CA (US)

(72) Inventors: Thomas Purves, San Francisco, CA (US); Margaret Szeto, Mountain View, CA (US); Chunxi Jiang, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 442 days.

(21) Appl. No.: 15/700,051

(22) Filed: Sep. 8, 2017

(65) Prior Publication Data
US 2018/0068365 A1 Mar. 8, 2018

Related U.S. Application Data

(60) Provisional application No. 62/385,211, filed on Sep. 8, 2016.

(51) Int. Cl.
*G06Q 30/06* (2012.01)
*H04L 12/58* (2006.01)

(52) U.S. Cl.
CPC ......... *G06Q 30/0619* (2013.01); *H04L 51/02* (2013.01); *H04L 51/046* (2013.01); *H04L 51/18* (2013.01)

(58) Field of Classification Search
CPC ......... G06Q 30/06–0645; G06Q 30/08; G06Q 50/01; H04L 51/02; H04L 51/046; H04L 51/18
See application file for complete search history.

(56) References Cited

U.S. PATENT DOCUMENTS

| 6,430,602 B1 * | 8/2002 | Kay ........................ H04L 51/04 709/206 |
| 8,819,156 B2 * | 8/2014 | Miner ..................... H04L 51/14 709/206 |

(Continued)

OTHER PUBLICATIONS

Chun, "Accelerating Modernization with Agile Integration," IBM Redbooks publication, Jan. 29, 2020, updated Mar. 18, 2020, 650pp. (Year: 2020).*

*Primary Examiner* — Adam L Levine
(74) *Attorney, Agent, or Firm* — Loeb & Loeb LLP (57) ABSTRACT

A computerized method for integrating actionable items using a messaging artificial intelligence. A first actionable item is provided to a user for selection. In response to the selection, a processor activates a messaging artificial intelligence ("AI") for instantiation in a messaging software. The messaging AI interacts with the user in the messaging software as a function of the message and the action and obtains parameters for the action. The messaging AI determines to terminate the interaction and, once terminated, the messaging AI generates a second actionable item for execution by a data payload execution platform. The data payload execution platform executes the second actionable item to complete processing of the action in the first actionable item.

14 Claims, 9 Drawing Sheets

(56) References Cited

U.S. PATENT DOCUMENTS

| | | | |
|---|---|---|---|
| 9,419,928 B2* | 8/2016 | Miner | H04L 51/18 |
| 9,559,992 B2* | 1/2017 | Zhang | H04L 51/04 |
| 9,652,122 B2* | 5/2017 | Lopez | G06F 3/048 |
| 9,935,904 B2* | 4/2018 | Sharma | G06F 17/2785 |
| 10,262,654 B2* | 4/2019 | Hakkani-Tur | G10L 15/16 |
| 10,540,068 B2* | 1/2020 | Choi | G06Q 30/0267 |
| 2003/0135618 A1* | 7/2003 | Pisupati | H04L 51/14 |
| | | | 709/225 |
| 2007/0180060 A1* | 8/2007 | Patel | G06Q 10/107 |
| | | | 709/219 |
| 2011/0161427 A1* | 6/2011 | Fortin | H04L 51/20 |
| | | | 709/206 |
| 2016/0112362 A1* | 4/2016 | Perazzo | H04L 51/18 |
| | | | 455/466 |
| 2020/0159392 A1* | 5/2020 | Choi | G06F 3/04842 |

* cited by examiner

METHOD FOR GENERATING BY PROCESSOR A SECOND ACTIONABLE ITEM FOR EXECUTION BY A DATA PAYLOAD EXECUTION PLATFORM IN ORDER TO COMPLETE PROCESSING OF AN ACTION FROM A FIRST ACTIONABLE ITEM

CROSS-REFERENCE TO RELATED APPLICATION

This is a nonprovisional patent application of the provisional patent application, Ser. No. 62/385,211, filed on Sep. 8, 2016, whose disclosure is incorporated by reference in its entirety herein.

FILED OF INVENTION

This invention generally relates to artificial intelligent software applications that handle cross-platform processing of commands.

BACKGROUND

The Internet is one of the most significant innovations in bringing people together, despite the physical distances between them. It paves the way for more interactions between people. For example, electronic mail, one of the most frequently used communication means in the Information Age, could not be so prevalent without the Internet.

As communication devices become mobile, so are communication means. While voice communications via telephone numbers are still the norm, short messaging or text messages are becoming the default communication method. Moreover, these text messages have evolved to be capable of handling more than just alphanumerical contents. For example, messaging software is capable of allowing text messages in the form of "chat messages" or "instant messages" to include hyperlinks, voice messages, graphics, images, videos, and animations such that they capture the full range of expressions and emotions that the participants wish to convey.

It is desirable therefore to further expand the scope of the activities to enable chat participants to perform many additional tasks other than chats or conversing via the messaging software. It is also desirable to enable seamless integration and transfer of information or data across software boundaries, such as from a data payload execution platform to the messaging software.

SUMMARY

Embodiments of the invention provide a seamless integration between a data payload execution platform (where the platform lacks its own messaging capability) and a piece of messaging software, using an artificial intelligent ("AI") application within the messaging software. Embodiments of the invention present a first actionable item in message container in first executable environment, such as a hyperlink in a piece of email software. The first actionable item is to be executed in response to a selection by a user. Upon execution of the actionable item, the AI application or bot is instantiated in a second execution environment, such as the messaging software to enable the user to interact with the AI application. AI application eventually generates a second actionable item. This second actionable item is executed by a data payload execution platform, such as a payment checkout app, to complete the interactions that started between the user and the AI application in the messaging software.

BRIEF DESCRIPTION OF THE DRAWINGS

The invention may be better understood by references to the detailed description when considered in connection with the accompanying drawings. The components in the figures may not necessarily be to scale, emphasis instead being placed upon illustrating the principles of the invention. In the figures, like reference numerals designate corresponding parts throughout the different views.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
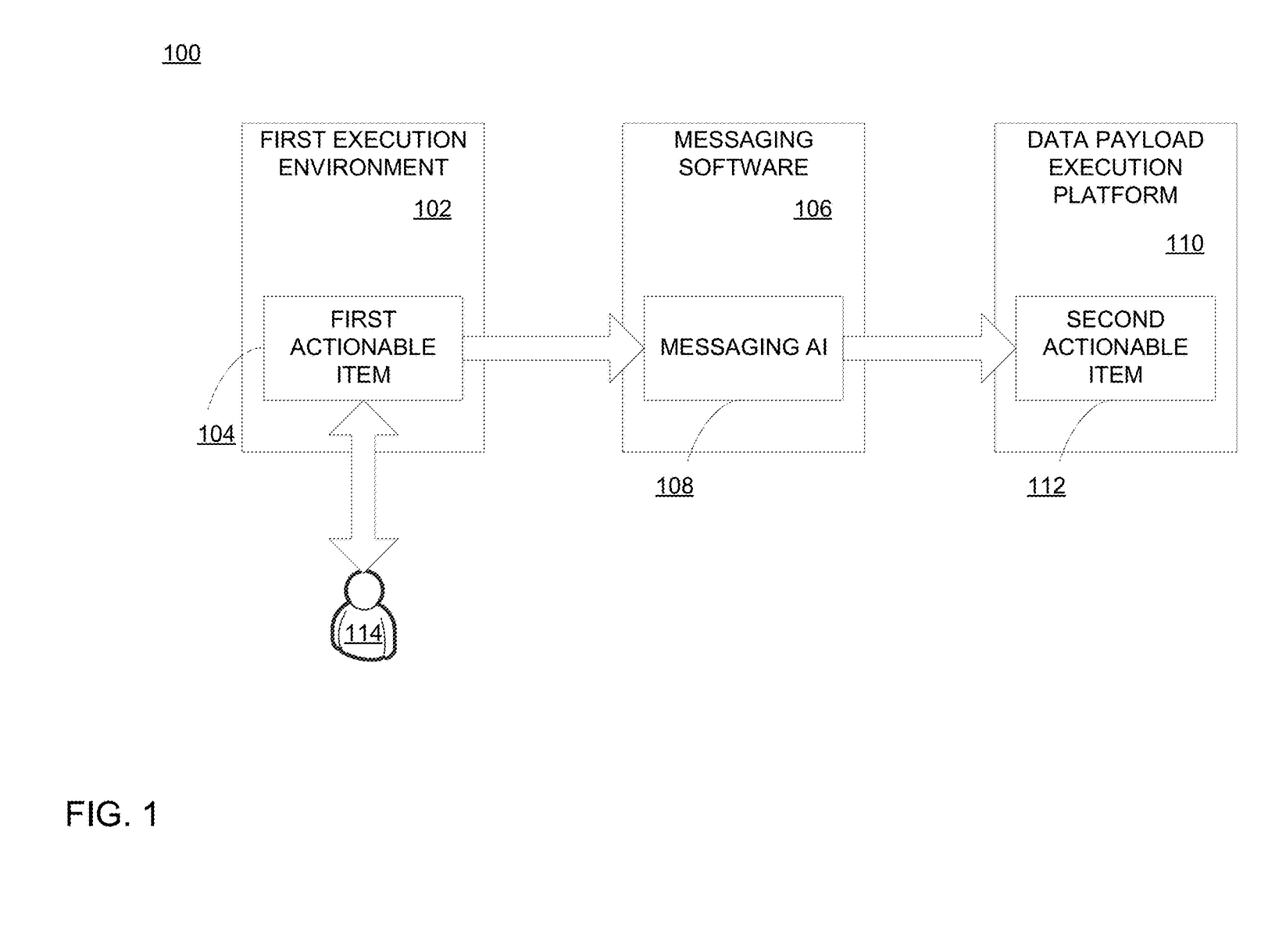
FIG. 1 is a block diagram illustrating a system with a messaging artificial intelligent ("AI") application within a messaging software according to one embodiment of the invention.

Referring now to FIG. 1, a block diagram illustrating a system 100 with a messaging artificial intelligent ("AI") application 108 within a messaging software 106 according to one embodiment of the invention. In one example, the system 100 includes a computer system that is part of a portable computing device 801 shown in FIG. 7 or FIG. 8. For example, the system 100 may be a smartphone, a laptop, a smart watch, or other portable computing device. Based on computer-executable instruction execution capabilities of the system 100, a first execution environment 102 may be operable within the system 100. In one embodiment, the first execution environment 102 includes a piece of software or application program that includes functionalities to enable a user 114 to send, receive, edit, review, etc., electronic mail messages. In another embodiment, the first execution environment 102 may be an Internet browser application capable of display contents and messages posted by servers on the Internet. In another embodiment, the first execution environment 102 may be an app installed on the system 100. It is to be understood that the first execution environment 102 may be a wide range of applications, software programs, etc., that enables the user 114 to communicate with others via the system 100.

In another embodiment, the first execution environment 102 receives messages and/or contents for the user 114. One of the messages/contents may be a first actionable item 104 that the user 114 may respond to trigger an action on a message/content included therein. In one embodiment, the first actionable item 104 may be a hyperlink that may require a selection from the user 114. For example, a signal to the first execution environment 102 triggers the creation of the first actionable item 104. Next, the selection by the user 114 of the first actionable item may include an input, a gesture, a voice command, etc. In another embodiment, the first actionable item 104 may require a series of selections that need to be completed within a period or other conditions. For example, the series of selections may include one or more responses to a questionnaire or a feedback form, a combination of gesture and voice command, a response to a challenge question, etc. In another embodiment, the first actionable item 104 may be presented to the user 114 in the form of an image, a text string, an audio file, or the like.

In one embodiment, the first actionable item 104 includes data parameters that triggers or calls a messaging artificial intelligent ("AI") application to be instantiated. For example, the first actionable item 104 includes data such as personal information of the user 114 as associated with the first execution environment 102, a message/content payload for storing the message/content, and header or data packet information. In one example, the first actionable item 104 may include a data structure or schema for storing the data contained therein. In another example, the message/content payload includes a variety of messages/contents. In one instance, the message/content may be a promotion or offer to purchase an item from a merchant. In another instance, the message/content may be an object of a search query. In a further instance, the message/content may be an object to be rendered by another execution environment.

The action of the first actionable item 104 may include a trigger or a link generated by the first execution environment to call the messaging AI 108, which is executable within a messaging software 106. In one example, the messaging software 106 includes a chat software, a chat app, an instant messaging software, an instant messaging app, a social media content sharing software/app, an app/software that shares graphical messages/images, etc. The messaging AI 108 may include a chat bot, a chat spider, or the like that may perform specific human tasks more efficiently. In one embodiment, the messaging software 106 and/or the messaging AI 108 may be connected to an additional cloud service provider capable of processing and responding to interactions between the messaging AI 108 and the user 114. For example, the additional cloud service provider may provide data and algorithm feeds to the messaging AI 108 to respond to the user 114.

Figure 2:
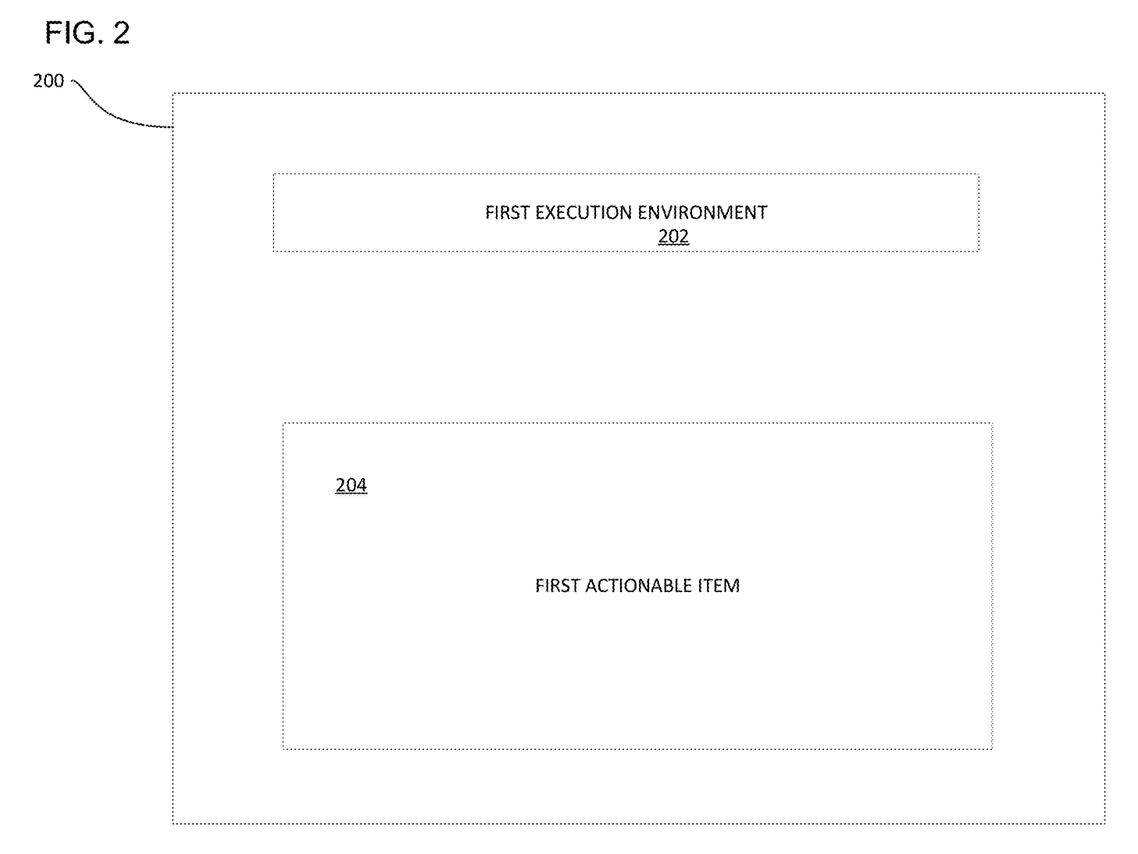
FIGS. 2 to 5 are block diagrams illustrating graphical user interfaces implemented according to one embodiment of the invention.
Figure 3:
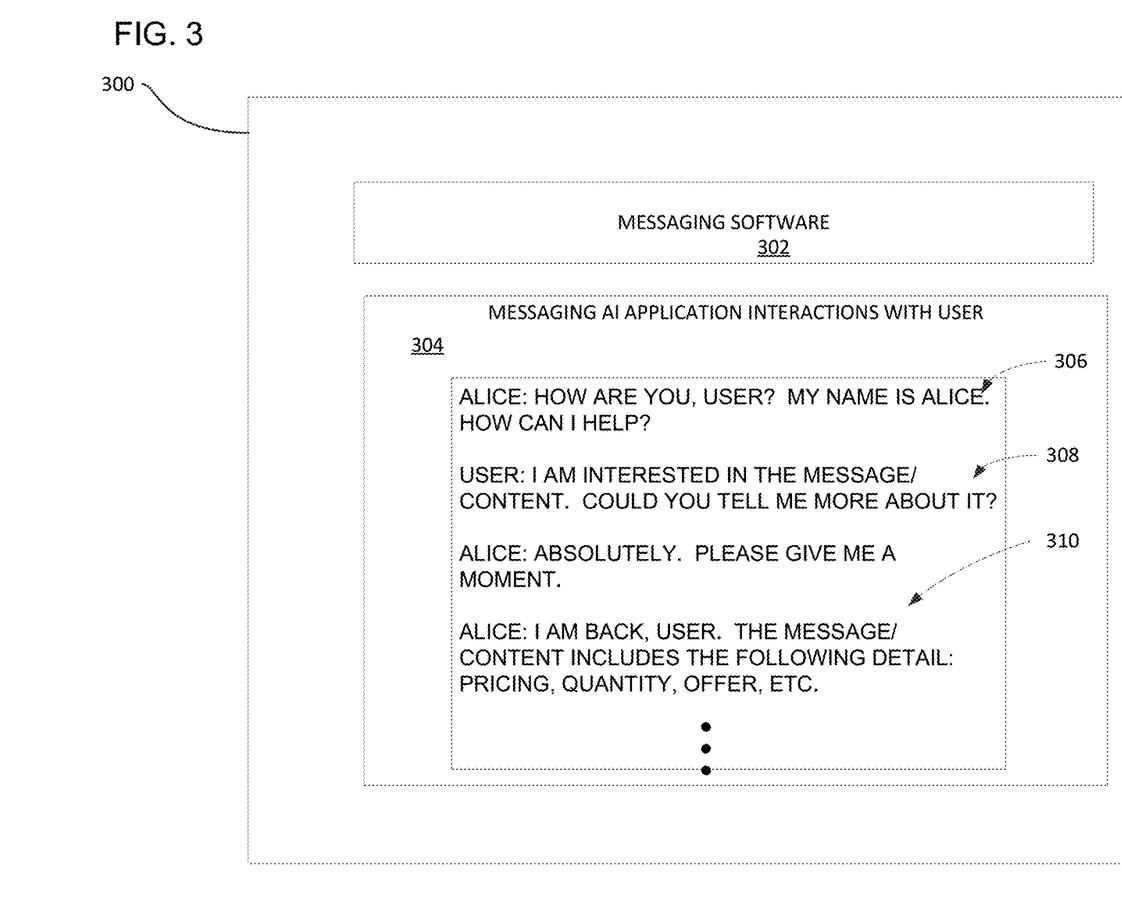

Referring now to FIGS. 2 to 5, a series of block diagrams illustrating graphical user interfaces (GUI) implemented according to one embodiment of the invention. For example, FIG. 2 illustrates a simplified diagram of a GUI 200 showing the first execution environment 202 with a content placeholder 204 for the first actionable item 104. In FIG. 3, a GUI 300 illustrates a simplified messaging software 106 with a message pane 304 showing interactions between the user 114 with the message AI 108. In one example, the messaging AI 108 may communicate or converse with the user 114 with messages such as those shown in 306 and 310. In this instance shown in FIG. 3, the messaging AI 108 may use a name of "Alice" when interacting with the user 114. It is to be understood that the user 108 may not realize or appreciate that "Alice" is not a real person but an artificial persona created by the messaging AI 108. As such, the user 114 may interact with the messaging AI 108 with messages such as 308 as if "Alice" were a real person. It is to be understood that the user 114 may interact with the messaging AI 108 via texts, graphics, audio files, or a combination thereof, as long as these means are within the capabilities of the messaging software 106.

In another example, the interactions between the messaging AI 108 and the user 114 may center around the message/content within the first actionable item 104. In other words, since the user 114, after selecting the first actionable item 104, is directed to the messaging software 106, the user 114 naturally may begin to conduct conversations or dialogues with the messaging AI 108 as a function of the content and the action in the first actionable item.

Figure 4:
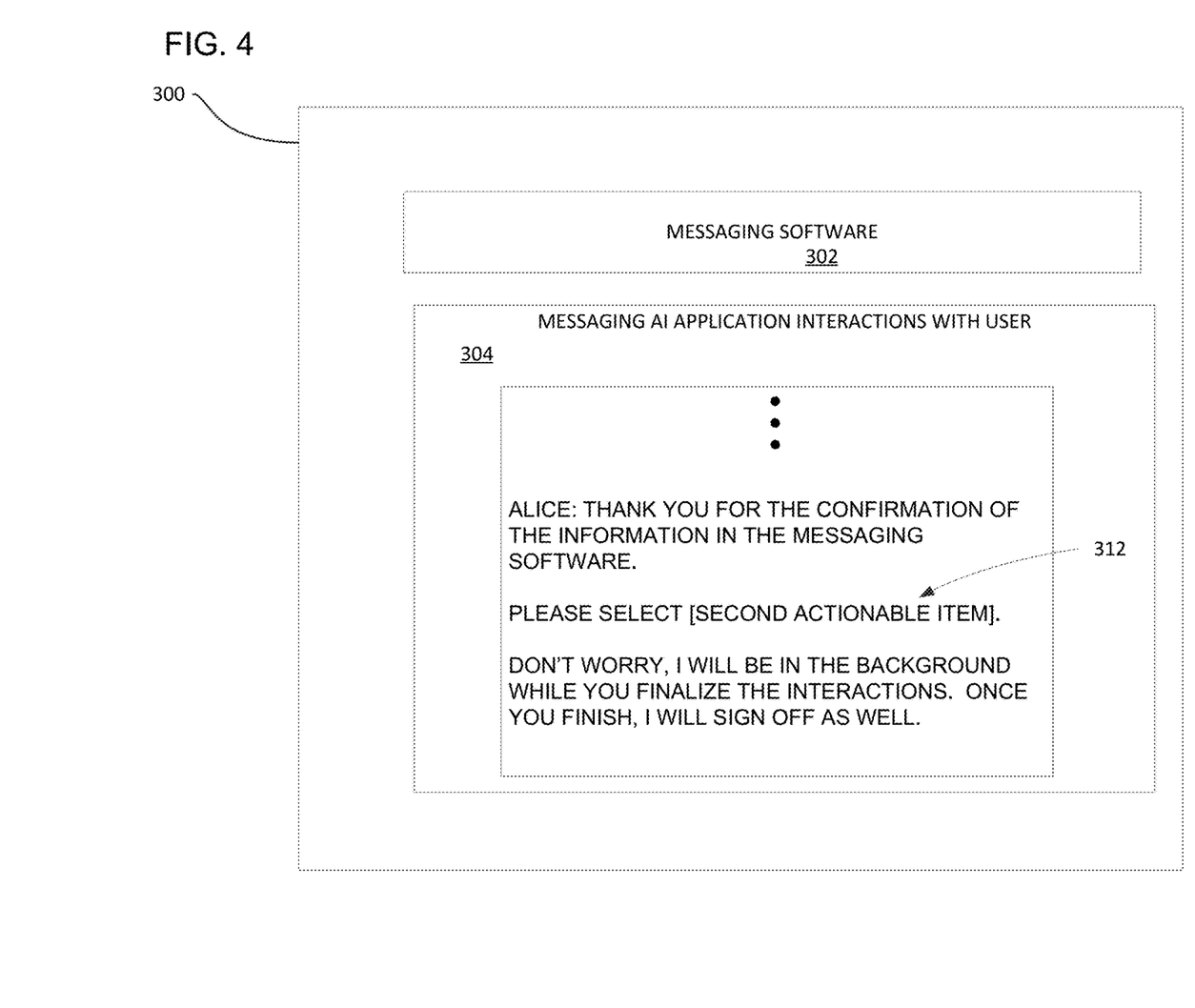

At some point, the interaction between the user 114 and the messaging AI 108 may come to a conclusion. For example, this conclusion may be as a result of the messaging AI 108 has obtained sufficient information or data that resolves the concerns or questions of the user 114 regarding the message/content in the first actionable item 104. As shown in FIG. 4, the messaging AI 108 may provide responses 312 to the user 114 indicating the end of the interactions.

Referring back to FIG. 1, the messaging AI 108 may generate a second actionable item 112 to be executed in a data payload execution platform 110 at the conclusion of the interaction with the user 114 in the messaging software 106. In one embodiment, the data payload execution platform 110 may include a number of data execution processing platform whose platform lacks messaging capabilities. For example, a bank or financial institution may have its computer systems with web portals and even an app for installed on a mobile device. However, it fails to provide convenient messaging services, such as chat platform, for the user. While it may include frequently asked question section on its help page, many times such page includes outdated information that is not helpful to the users.

In one embodiment, the second actionable item 112 includes the message/content from the first actionable item 104 along with additional information as a result of the interactions between the messaging AI 108 and the user 114.

For example, suppose the message/content of the first actionable item 104 is an object of a search query and the action is "search." Once the messaging AI 108 is triggered, the messaging AI 108 may ask additional information from the user 108, such as:

Alice: Would you like to search the object within the entire chat history or a chat history with a specific person or group?

User: The entire chat history, please.

Alice: Great, thanks! Please give me a moment . . . . Here are the search results and please click here for word format, here for PDF format, and here for a heat map according to time. Please let me know if you need anything else.

As illustrated above, the messaging AI 108 generates the second actionable item 112 ("click here for word format", "here for PDF format", and "here for a heat map according to time") from the first actionable item 104 (object) by adding additional parameters ("the entire chat history") from the interactions with the user 114. The second actionable item 112 may be executed in the data payload execution platform 110.

In a further example, suppose the message/content in the first actionable item 102 includes an offer to purchase an item from a merchant and the action is to purchase, the messaging AI 108 may interact with the user 114 to gather additional parameters:

Alice: Hello, User. I am more than happy to help you with the offer in the message/content. Before we begin, may I confirm your full name and address as . . . ?

User: Yes, that is correct.

Alice: Great! Thanks for confirming that. Regarding the offer from the merchant, may I please know the quantity?

User: That would be 1. However, it appears that there is a promotion for get to 2 and a third one is 50% off. Could you please tell me more about that?

Alice: Absolutely! Let me get the details for you . . . . Yes, the promotion is still running, but it ends tomorrow. Would you like to take advantage of that?

User: Let me think about it . . . . Yeah, sure, let's do it.

Alice: Wonderful. Please let me know the color/style of each of the 3 items and I will get you get the final pricing for you.

User: I would like to get . . . .

Alice: Fantastic. The total of the offer is $55.00 and based on the address that you confirmed earlier, there is no sales taxes. When you are ready, please select [second actionable item] to complete.

User: Thank you very much Alice.

Alice: Also, I will be in the background while you complete the process. Once you finish, I will sign off without further actions from you.

Figure 5:
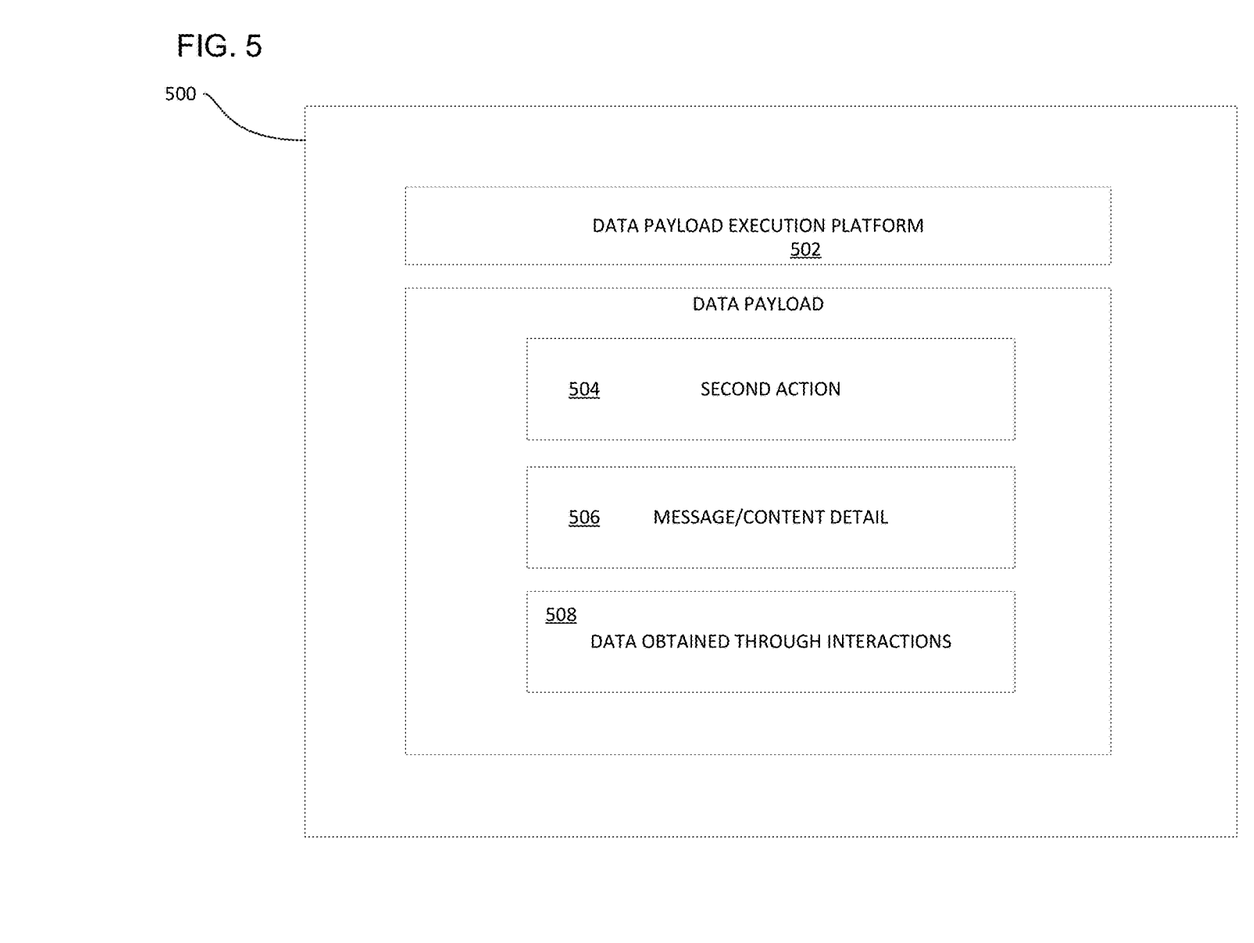

In one embodiment, the second actionable item 112 includes a data structure to store data that is to be consumed by the data payload execution platform 110. Referring now to FIG. 5, the second actionable item 112 includes at least one of the data fields storing the following data: second action 504, the message/content 506, and additional parameters or data obtained through interactions with the messaging AI 104. The data payload execution platform 502, through a processor accessible by the system 100, may process the second actionable item 112.

Using the two examples above (object of a search query and an offer to purchase an item from a merchant) of the second actionable item 112, the data payload execution platform 110 may be a document processing app/software that generates the search result in a format that is specified in the second actionable item 112 (e.g., word format, PDF format, etc.). In the second example, the data payload execution platform 110 may be a wallet app/software, a checkout app/software, or a server-based software that may handle payment transactions. For example, the second actionable item 112 may include a link or path to the server-based software to process the checkout. In this embodiment, the data payload execution platform 110 may include data storages for at least storing a profile of the user, and a profile of the merchant. The data payload execution platform 110 may further interact with the user to complete the process.

It is to be understood that, as shown in FIG. 1, as the message/content carried from the first actionable item 104 to the second actionable item 112, the message/content crosses at least three app/software boundaries: the first execution environment 102, the messaging software 106, and the data payload execution platform 110. In one embodiment, the message/content is presented in a uniform format or protocol that is consumable by any of the three app/software above. In another embodiment, the system 100 includes application programming interfaces (APIs) that enable seamless cross-app or cross-software communications.

This approach is of course different from existing models because existing model of app/software design typically attempts to build a robust app/software that is capable of handling all tasks or instructions. However, this in-app architecture requires the app/software itself includes all necessary software infrastructure, data structure, data schemas, protocol layers, etc., to be fully comprehensive. Such app/software may not be a desirable approach when dealing with a system that has limited resources, either on power supply, data storage, or processing power.

In addition, many app/software includes a "frequently asked questions" or "help" section. However, these sections are inadequate and many times have up-to-date information to help the users.

Moreover, embodiments of the invention create flexibilities that elevate the capabilities of the messaging AI 108 as well as the data payload execution platform 110. In other words, the messaging AI 108 becomes a personal assistant for the user 114, when the first actionable item 102 may come from anywhere: a news alert, a notification, etc.

Figure 6:
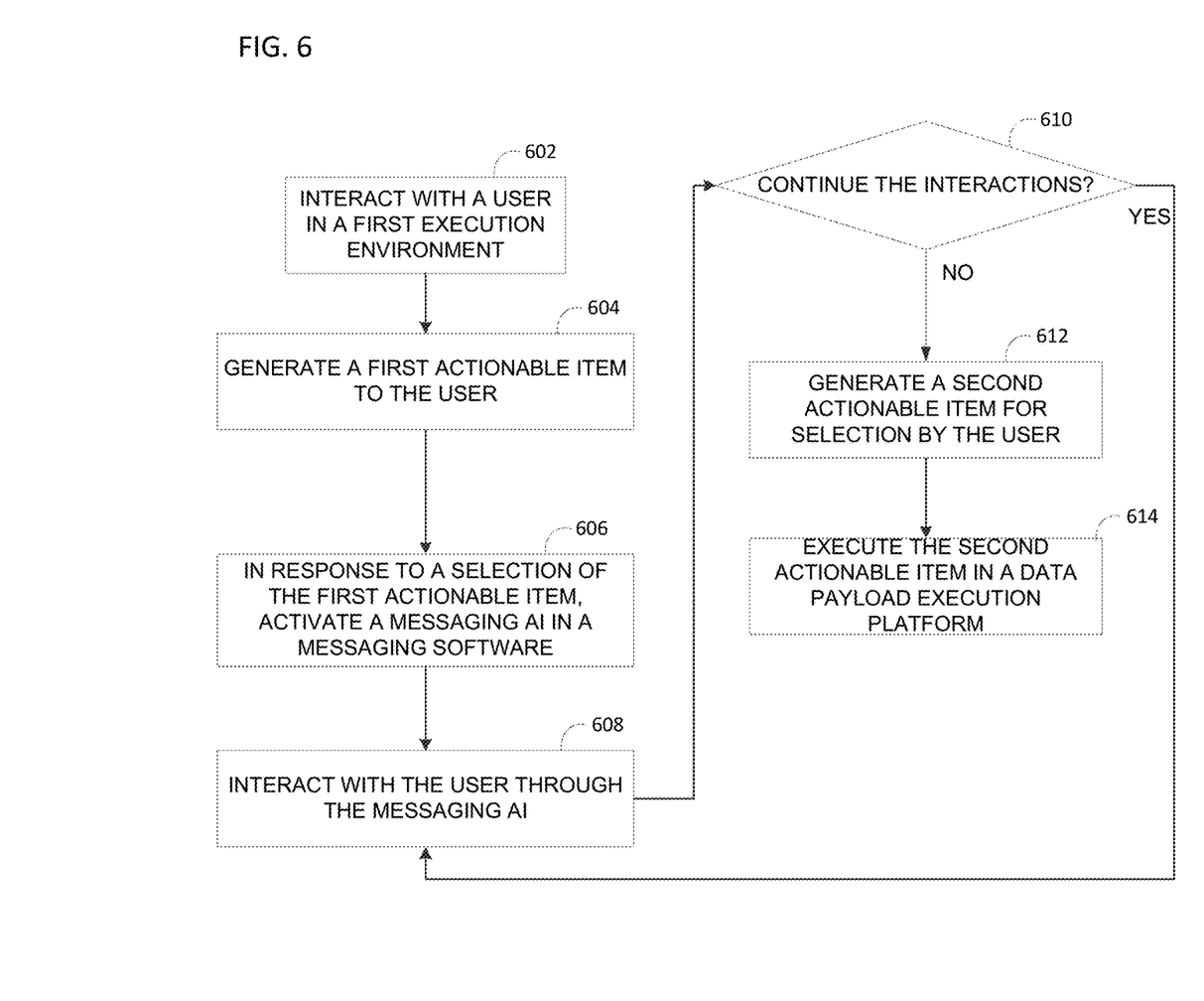
FIG. 6 is a flow diagram illustrating a method for messaging AI application within a messaging software to generate actionable items according to one embodiment of the invention.

FIG. 6 is a flow diagram illustrating a method for messaging AI application within a messaging software to generate actionable items according to one embodiment of the invention. At 602, a system 100 may interact with a user via a first execution environment. At 604, the first execution environment may generate a first actionable item to the user. In response to a selection of the first actionable item, at 606, the system may activate a messaging AI in a messaging software. At 608, the messaging AI may interact with the user. At 610, the messaging AI may determine to continue interact with the user. In one embodiment, factors needed to determine to continue interactions with the user may depend on whether parameters have been collected by the messaging AI according to the action specified in the first actionable item.

If it is determined that the messaging AI is to continue to interact with the user, the messaging AI returns to 608. Otherwise, the messaging AI may generate a second actionable item for selection by the user at 612. In response to the selection, a data payload execution platform may execute or process the second actionable item therein.

Figure 7:
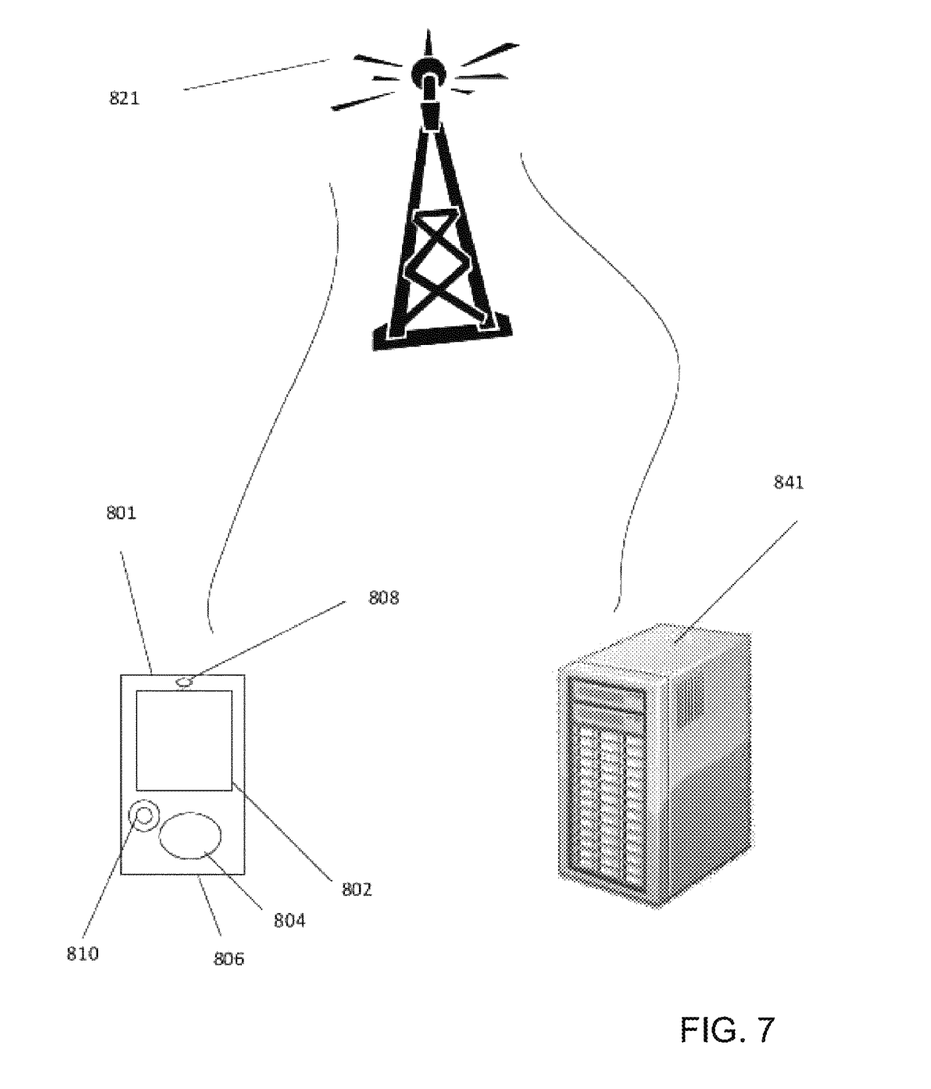
FIG. 7 is an illustration of a commerce bot system according to one embodiment of the invention.

FIG. 7 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

Figure 8:
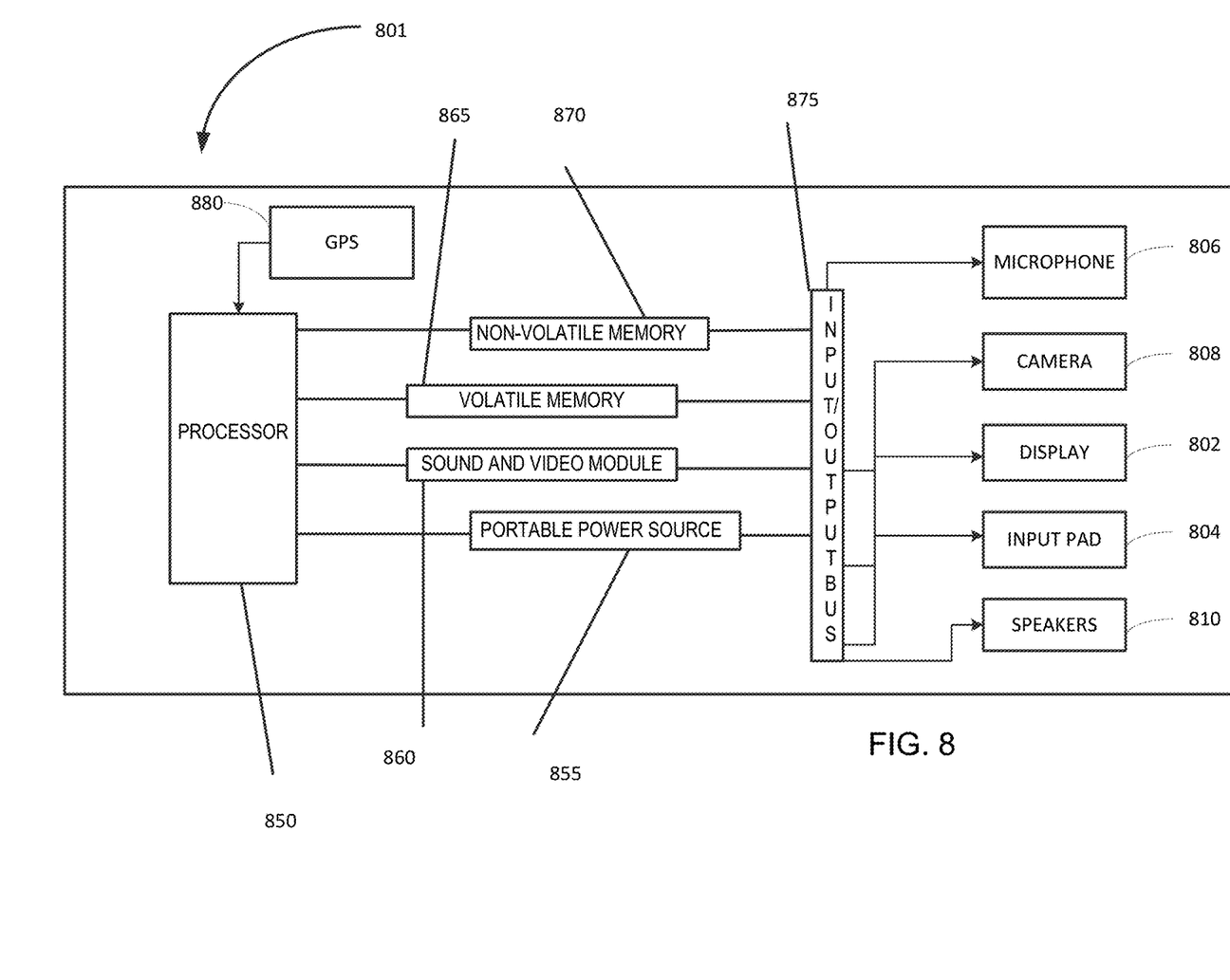
FIG. 8 is an illustration of a portable computing device.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 8 may be a simplified illustration of the physical elements that make up a portable computing device 801 and FIG. 9 may be a simplified illustration of the physical elements that make up a server type computing device 841.

FIG. 8 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 9:
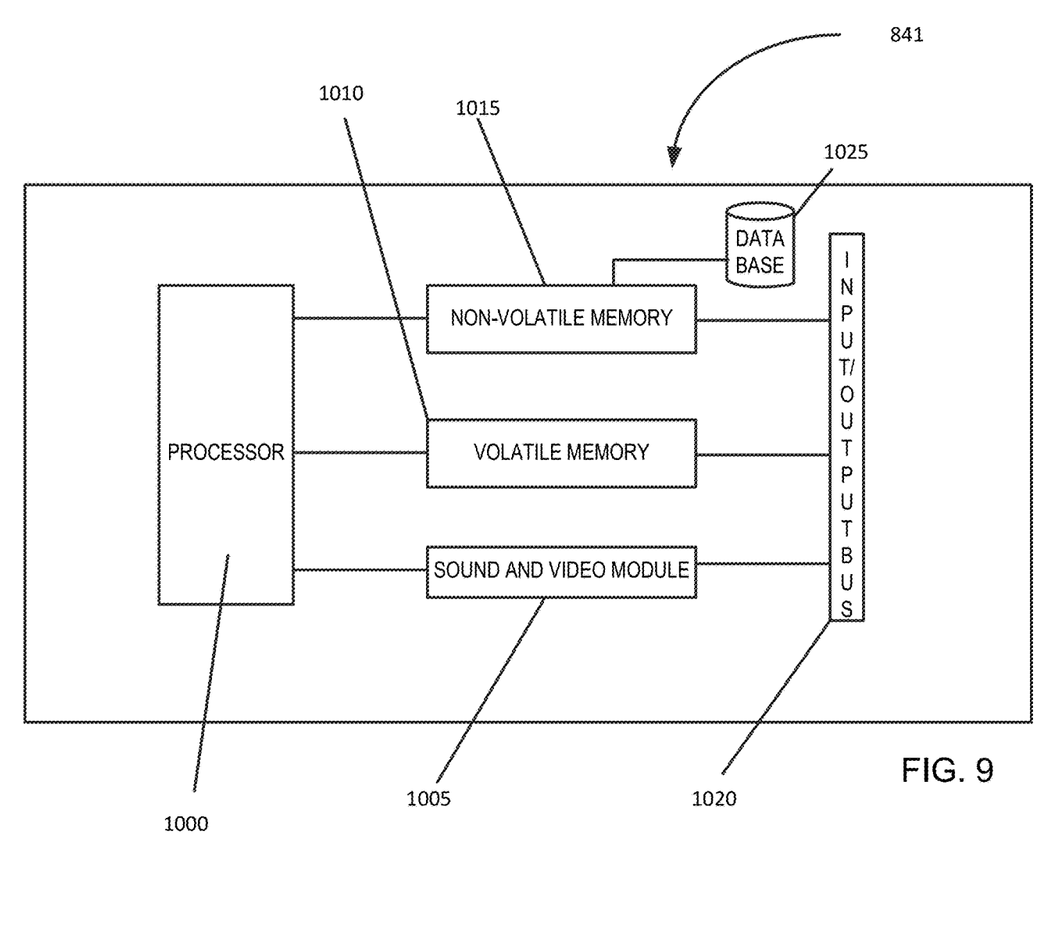
FIG. 9 is an illustration of a server computing device.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The claimed system and method may address several technical problems and challenges, some of which are described. Currently, entering potential sensitive data across networks makes users nervous to the point that a sale may be lost or money or time saving tips or coupons may not be received. By using a proprietary network such as a payment network, to transfer potentially sensitive data, security may be higher and users may be more open to joining additional beneficial programs. Similarly, moving data from one payment system to another loyalty system has felt risky to some users, but by using a proprietary, trusted network, the data may be communicated in a more trustworthy fashion. In addition, formatting data and communicating data in a manner which may be understood by a variety of additional programs is a technical challenge or problem which the system and method has addressed.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data payload execution systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized method for generating actionable items based on messaging interactions comprising:
  providing, via a processor and via a user interface (UI) presented on a portable computing device, to a user with a first actionable item, said first actionable item, being based on a first execution environment, comprising a message and an action, said first actionable item specifying a series of selections that need to be completed within a period or other conditions;
  receiving, by the processor and via the UI a selection of the first actionable item from the user;
  in response to the selection, activating, by the processor, a messaging artificial intelligence ("AI") application for instantiation in a messaging software, said messaging software being different from the first execution environment;
  interacting, by the processor via the messaging AI application, with the user in the messaging software as a function of the message and the action;
  obtaining, by the processor, parameters for the action in response to interacting;
  determining, by the messaging AI application, to terminate the interacting with the user on the message;
  in response to the determining being positive, generating, by the processor via the messaging AI application, a second actionable item for execution by a data payload execution platform, said data payload execution platform being different from the first execution environment and the messaging software, said second actionable item including at least the message, the action, the parameters, and information of the user associated with the messaging software; and
  executing the second actionable item by the processor through the data payload execution platform to complete processing of the action.

2. The computerized method of claim 1, wherein the first execution environment comprises an electronic mail messaging software.

3. The computerized method of claim 1, wherein the first execution environment comprises a mobile app.

4. The computerized method of claim 1, wherein the first actionable item comprises a hyperlink.

5. The computerized method of claim 1, wherein the first actionable item comprises data parameters for triggering the messaging AI application for execution in the messaging software.

6. The computerized method of claim 1, wherein the data payload execution platform comprises a data execution processing platform whose platform lacks messaging capabilities.

7. A computerized system for generating actionable items based on messaging interactions comprising:
   a processor for executing computer-executable instructions;
   a memory for storing computer-executable instructions, said processor and the memory being interconnected;
   wherein the processor is configured to execute a first execution environment, said first execution environment is configured to provide a user interface (UI) on a portable computing device to interact with a user with a first actionable item, said first actionable item, being based on, comprising a message and an action, said first actionable item specifying a series of selections that need to be completed within a period or other conditions;
   wherein the first execution environment is configured to receive via the UI interactions of the first actionable item from the user;
   in response to the interactions, the processor is configured to activate a messaging artificial intelligence ("AI") application for instantiation in a messaging software, said messaging software being different from the first execution environment;
   wherein the messaging AI application is configured to interact with the user in the messaging software in response to the message and the action;
   wherein the processors is configured to identify parameters of the action in response to interacting for storage in the memory;
   wherein the messaging AI application is configured to generate a second actionable item for execution by a data payload execution platform after determining to terminate interactions with the user, said data payload execution platform being different from the first execution environment and the messaging software, said second actionable item including at least the message, the action, the parameters, and information of the user associated with the messaging software; and
   wherein the processor is configured to execute the second actionable item by the processor through the data payload execution platform to complete processing of the action.

8. The computerized system of claim 7, wherein the data payload execution platform comprises a data execution processing platform without interactive messaging capabilities to interact with the user.

9. The computerized system of claim 7, wherein the second actionable item adds additional parameters to the parameters of the first actionable item.

10. The computerized system of claim 7, wherein the second actionable item includes a data structure with data to be processed by the data payload execution platform.

11. The computerized system of claim 7, wherein the second actionable item comprises a link to a software to process a transaction checkout, and wherein data payload execution platform comprises an electronic wallet app to complete the transaction checkout.

12. The computerized system of claim 7, wherein the first execution environment, the messaging software, and the data payload execution platform comprise different execution boundaries.

13. The computerized system of claim 12, wherein the processor executes application programming interfaces (API) to interact with the first execution environment, the messaging software, and the data payload execution platform across the execution boundaries.

14. The computerized system of claim 7, wherein the first execution environment comprises a mobile app.

* * * * *